United States Patent [19]

Gödeke

[11] 4,249,764

[45] Feb. 10, 1981

[54] GARDEN FORK

[75] Inventor: Henning Gödeke, Schorndorf-Oberberken, Fed. Rep. of Germany

[73] Assignee: Wilhelm Abt GmbH & Co. KG, Fed. Rep. of Germany

[21] Appl. No.: 61,316

[22] Filed: Jul. 27, 1979

[30] Foreign Application Priority Data

Aug. 23, 1978 [DE] Fed. Rep. of Germany ....... 2836809

[51] Int. Cl.³ .............................................. A01B 9/00
[52] U.S. Cl. .................................................. 294/55.5
[58] Field of Search ................. 294/49, 55.5, 50.6, 294/51, 55; 56/327 R, 400.21; 209/417, 418, 419

[56] References Cited

U.S. PATENT DOCUMENTS

| 843,472 | 2/1907 | Lotter | 294/55.5 |
| 1,755,651 | 4/1930 | Kingsbury | 294/55.5 |

Primary Examiner—James B. Marbert
Attorney, Agent, or Firm—Craig & Antonelli

[57] ABSTRACT

A forged garden fork is provided which has a plurality of tines attached to a back or top tine support. The tines are tapered to points at their bottom ends and are provided on their rear sides with a projecting section. In order to minimize material needed for manufacture and minimize total weight of the garden fork, the tines are provided with a depression running lengthwise forged into the front sides, which depression is increasingly deeper and wider with increasing distance from the back or tine support and terminating a short distance from the tapered bottom points of the respective tine.

10 Claims, 6 Drawing Figures

GARDEN FORK

BACKGROUND AND SUMMARY OF THE INVENTION

The invention relates to a forged garden fork with a plurality of tines projecting from a back or top tine support, said tines tapering to a point and being provided on their rear sides with a raised profile running lengthwise.

A garden fork of the type described hereinabove has the advantage over a spade that it can be thrust more easily into the ground. In many cases, a garden fork of this type will penetrate the ground without the user's foot being required, as would be the case in forcing a spade into the ground by the user placing his weight on the spade and forcing it into the ground.

An object of the invention is to improve a garden fork of the type described hereinabove in such manner that on the one hand its penetration into the ground is further facilitated, while on the other hand material savings are achieved, so that handling is made easier by greater ease of penetration and lower weight, and manufacture is made less expensive because of the weight and material savings.

This object is achieved by virtue of the fact that a depression running lengthwise is provided in the front side of each tine, said depression becoming deeper and/or wider with increasing distance from the top tine support, said depression also tapering and ending at a distance from the tapering bottom points of the respective tine.

This design makes possible a considerable savings in weight since the tines can be so designed by virtue of this depression that their cross-sectional shape and cross-sectional area are adjusted to the required section modulus which is maximum in the area of the transition to the top tine support and then decreases toward the bottom tip. In addition, the tines and points are undercut, so that penetration of the garden fork is facilitated, because the earth can spread out in the depression.

In an advantageous embodiment of the invention, it is provided that the depression extends across the full width of the tine, along approximately ⅔ the length of the tine. This full width depression is advantageous to prevent the turned-up earth from clinging to the tines of the fork.

In advantageous preferred embodiments it is provided that the depression has an essentially triangular or round cross section. A depression of this kind is easily produced by forging. It is also advantageous to have the walls of the projecting profile on the rear side run approximately parallel to the walls of the depression. This also has a positive effect upon the penetration resistance.

These and further objects, features and advantages of the present invention will become more obvious from the following description when taken in connection with the accompanying drawings which show, for purposes of illustration only, a single embodiment in accordance with the present invention.

DETAILED DESCRIPTION OF THE DRAWINGS

The garden fork shown has a back 1 with a rectangular cross section, to which four tines 2 are attached, of which only two are shown. Tines 2 are made in the form of lanceolate tines; in other words they widen to approximately twice their initial width approximately one-third of the way along before they taper again toward the point. Back 1 is provided on the side away from tines 2 with a centrally disposed pin 3, which serves to accept the handle, said handle being forced onto pin 3, which preferably has a rectangular cross section, and being then surrounded with a ferrule, tubular socket, or clamp.

Figure 1:
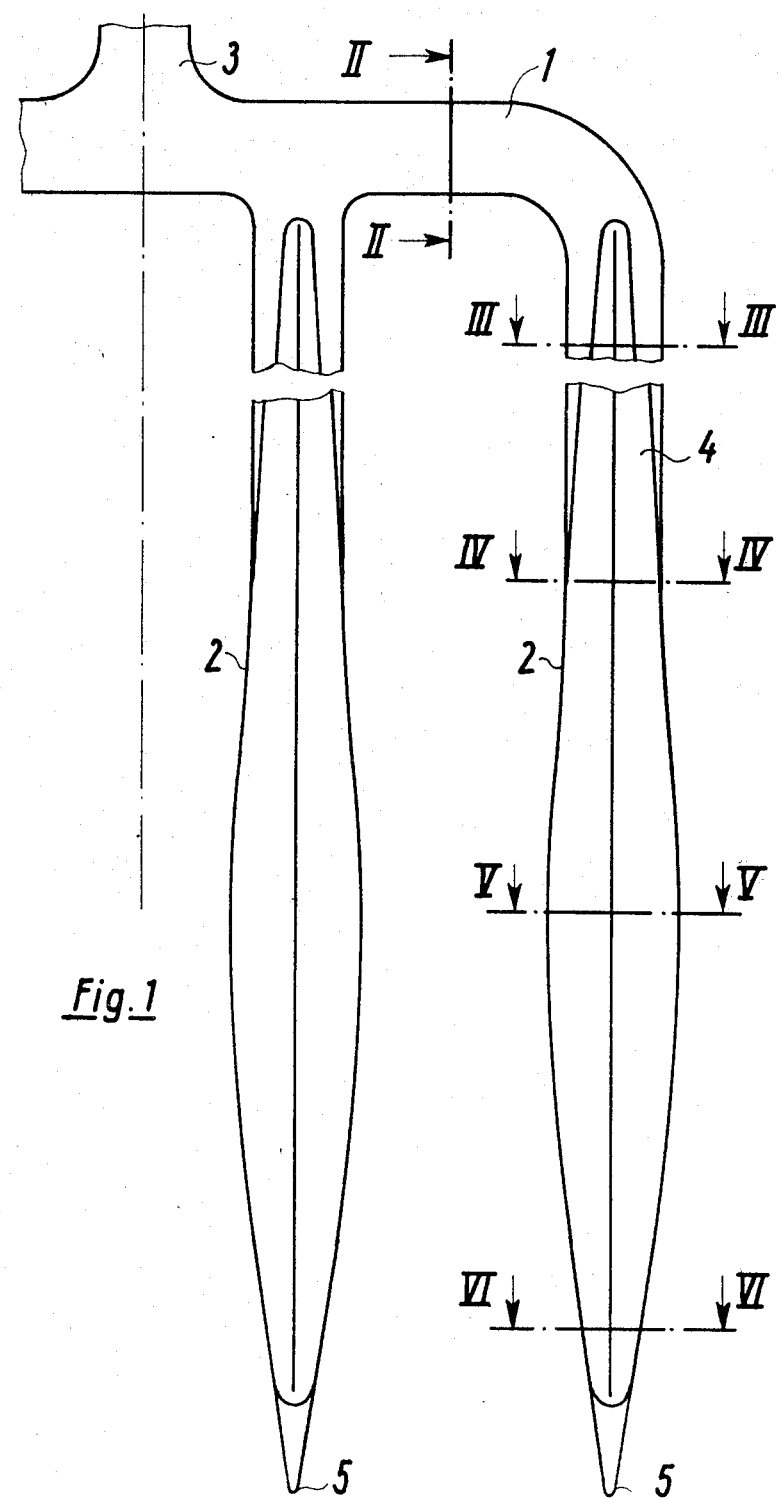
FIG. 1 is a partial top view of one-half of a fork which is laying horizontal and is constructed according to a preferred embodiment of the invention.
Figure 2:
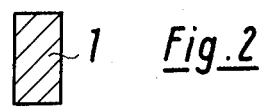
FIG. 2 is a cross sectional view along line II—II in FIG. 1 in the vicinity of the back or top tine support of the fork.
Figure 3:
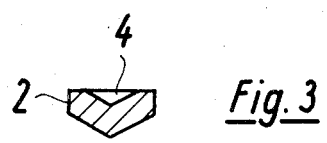
FIGS. 3 to 6 are respective sectional views along lines III—III to VI—VI of FIG. 1.

The garden fork is made from a piece of flat stock by forge rolling, and the thickness of the stock roughly corresponds to the thickness of the back (FIG. 2). The individual tines are made by forge rolling.

Figure 4:
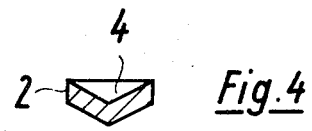
Figure 5:
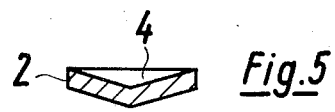
Figure 6:

In order to be able to save material without reducing the strength of the garden fork, the tines are provided on their front sides with a recess or depression 4, which extends from the vicinity of the transition of the back 1 up to a short distance from the bottom point 5 of tine 2. This recess or depression 4 is so shaped, especially in conjunction with the shape of the rear side of tine 2, that the section modulus of the individual tines likewise decreases inversely with the distance from back 2. This is readily possible since the section modulus is also required in this form for strength reasons, since the bending moment is still very small in the area adjoining points 5 and very large in the area of the transition to back 1. Depression 4, which has a triangular cross section as seen in the direction of the lengthwise axis of tines 2, is still relatively narrow and flat at the roots of the tines in the vicinity of back 1, whereby however, both their width and their depth increase continuously with distance. After approximately one-third of the length of tines 2, the depression extends across the full width of the tines, as is especially clear from FIG. 4. The depression covers the full width of tines 2 up to an area just before the point 5 of tine 2.

As is particularly clear from FIGS. 3 to 6, the shape of the rear sides of tines 2 is such that the rear side has the shape of a blunt cutting edge, located in the middle of tine 2. Depression 4 is adjusted to match the shape of the back side in such manner that the walls of depression 4 run approximately parallel to the walls of the profile on the rear side. In the area of the middle third of the tines, in other words, especially in the vincinity of sections 4 and 5 (FIGS. 4 and 5), the angle between the walls of depression 4 is greater than the angle between the outer walls of the profile, so that the maximum wall thickness of tines 2 is in the area of the central axis of the tines. This wall thickness decreases along the length of the tines.

A garden fork with bayonet tines, in other words, tines with a constant cross section, is likewise provided with a depression which again begins in the vicinity of a back and extends over the full width of the tines beginning at a point approximately one-third along the length of the tines, and then extends up to a point just before the points of the tines, according to another unillustrated preferred embodiment of the invention. The cross section of the depression is advantageously adjusted to the shape of the tines, in other words, rectangular or oval or round tines have corresponding rectangular or round cross sections for the depressions.

While I have shown and described several embodiments in accordance with the present invention, it is understood that the same is not limited thereto but is susceptible to numerous changes and modifications as known to those skilled in the art and I therefore do not wish to be limited to the details shown and described herein but intend to cover all such changes and modifications as are encompassed by the scope of the appended claims.

I claim:

1. Forged garden fork with a plurality of tines attached to a back, said tines tapering to points and being provided on their rear sides with a projecting section running lenghtwise, wherein a depression running lengthwise is forged into the front side of at least one of the tines, said depression starting adjacent the attachment of said tine of said back, becoming deeper and/or wider with increasing distance from the back in a manner causing the section modulus of said tine to decrease inversely with distance from said back and then tapering and terminating at a point just before the tapered points of the respective tines.

2. Garden fork according to claim 1, wherein the depression widens in a manner causing it to extend across the full width of the respective tine beginning at a point approximately one-third along the length of the tine from said back.

3. Garden fork accordng to claim 1 or 2, wherein the depression has an essentially triangular cross section.

4. Garden fork accordng to claim 1 or 2, wherein the depression has an essentially round cross section.

5. Garden fork according to claim 1 or 2, wherein the walls of the projecting profile on the rear side of the respective tine run approximately parallel to the inside walls of the depression, except in a middle third thereof whereat said inside walls are arranged with an angle therebetween that is greater than an angle formed between said walls of the projecting profile, so that the maximum wall thickness of said tines is in the area of a central axis of said tine.

6. Garden fork according to claim 1 or 2, wherein all of said tines of the fork are provided with said depressions.

7. Garden fork according to claim 1 or 2, wherein four of said tines are attached to the back, and wherein each of said tines is provided with one said depressions.

8. Garden fork according to claim 2, wherein said depression continues at a width equal to the width of said tine up to said terminating point.

9. Garden fork according to claim 5, wherein said depression continues at a width equal to the width of said tine up to said terminating point.

10. Garden fork according to claim 1, wherein said depression becomes deeper and wider with increasing distance from said back.

* * * * *